US005477652A

United States Patent [19]
Torrey et al.

[11] Patent Number: 5,477,652
[45] Date of Patent: Dec. 26, 1995

[54] COMPOSITE SECURITY WALL SYSTEMS

[75] Inventors: Bruce M. Torrey, Pittsfield; Scott A. Ravech, Randloph, both of Mass.

[73] Assignee: General Electric Company, Pittsfield, Mass.

[21] Appl. No.: 163,227

[22] Filed: Dec. 7, 1993

[51] Int. Cl.[6] ............................................. E04C 1/00
[52] U.S. Cl. ................................. 52/309.13; 428/703
[58] Field of Search ............................ 52/309.13, 288.9; 428/703

[56] References Cited

U.S. PATENT DOCUMENTS

| | | | |
|---|---|---|---|
| 2,026,835 | 1/1936 | Irwin | 52/238.1 X |
| 4,242,406 | 12/1980 | El Bouchnini et al. | 52/309.13 X |
| 4,549,379 | 10/1985 | Hoy et al. | 52/309.9 X |
| 5,079,078 | 1/1992 | Jutte, Jr. et al. | 428/703 X |

*Primary Examiner*—Carl D. Friedman
*Assistant Examiner*—Creighton Smith

[57] ABSTRACT

This invention is directed to a composite security wall system having high impact performance and meets certain fire codes. The composite comprises a thermoplastic sheet preferably a polycarbonate sheet and a dry wall type product such as gypsum board, laminated together with an adhesive. The composite is then fastened to wall studs with the thermoplastic sheet on the inside, i.e. in contact with the wall studs. When thus so placed, the composite provides a security wall having high impact performance and meets certain fire codes.

6 Claims, 1 Drawing Sheet

COMPOSITE SECURITY WALL SYSTEMS

FIELD OF THE INVENTION

The present invention is directed to a composite wall system that is easy to install, has high impact performance and meets certain fire codes, as later described herein. Generally and simply, this invention comprises a thermoplastic sheet laminated to standard dry wall type products.

BACKGROUND OF THE INVENTION

Providing the building and construction industry with an easy to install, high impact and penetration resistant security wall system has proven difficult. Current designs call for the installation of metal mesh with gypsum board or concrete or masonry wall products, which are heavy and costly to install, or other gypsum type products that are double walled, which would further add considerably to the overall cost. Since such security wall products require double installation or expensive masonry or concrete products, a single composite security wall system significantly reduces overall costs by being easy to install.

A product on the market today that has been successfully used in security wall systems is a gypsum material that has a gypsum core and densified gypsum outer layers. While this material does provide higher impact than standard gypsum, it, nevertheless, must be double walled to provide security means. Even though, its impact resistance is not sufficient to meet the requirements of many applications, since it does not appear to exceed 100 ft. lbs. of impact.

Other systems that have been used to provide impact performance and to meet building code requirements for fire resistance consist of masonry products or several layers (more than 2) of gypsum board. Other approaches called for the use of metal mesh welded to metal studs with gypsum board fastened over the metal mesh. The gypsum board in the above system would actually be fastened to the metal wall studs.

By security, it is meant that the use of the product of this invention can be employed in wall systems in such institutions for example as minimum security prisons, detention areas, hospitals, particularly asylums and psychiatric facilities.

DETAILED DESCRIPTION OF THE INVENTION

Figure 1:
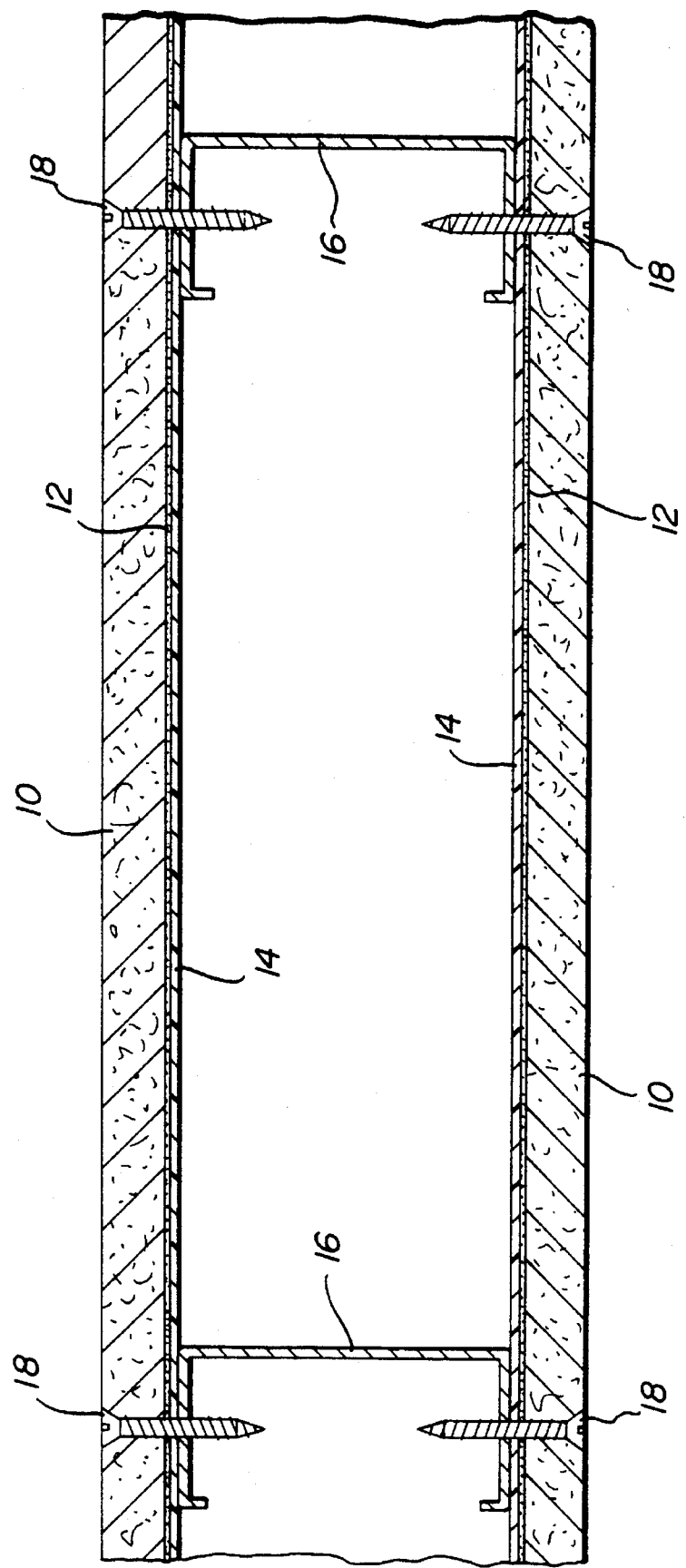

This invention is directed to a composite security wall system comprising a dry wall type product having laminated to one side thereof a thermoplastic sheet, preferably a polycarbonate sheet having a thickness not exceeding ⅛". Lamination is provided by way of an adhesive which binds the thermoplastic sheet to the dry wall sheet. For the purposes of this invention in a security wall system, the thermoplastic sheet is on the inside of the wall, i.e. the face of the thermoplastic sheet is against the wall studs, which are preferably metal wall studs for a high security system.

A typical composite comprises a standard gypsum ⅝" "C" wall board and an 0.080 inch thick polycarbonate sheet laminated together. The composite is then fastened to metal studs, preferably with metal screws. The metal studs can be so placed as is generally employed in the building trade, varying anywhere from about 12" to 24" or more on center depending on the wall construction wanted. The adhesive employed to laminate the dry wall product and polycarbonate sheet can be any adhesive compatible with the polycarbonate sheet or such other thermoplastic sheet, preferably a contact adhesive sold by a number of different adhesive manufacturers.

In the practice of this invention, the dry wall product that can be employed in this invention can be any of the known dry wall products such as gypsum board, cement board, Sheet Rock (U.S. Gypsum Company), Fiberbond (Louisiana Pacific), which are both gypsum type materials utilizing paper fibers or glass fibers, etc. In addition, the dry wall product and thermoplastic sheet are adhesively attached. If the individual components are merely fastened as separate sheets to the metal studs such as with metal screws, it has been found that the thermoplastic sheet, namely the polycarbonate sheet and dry wall product crack upon being impacted with an impactor such as a metal ball. With the composite of this invention that is the laminate of dry wall sheet material and polycarbonate sheet, it has been found to withstand an impact of well in excess of 650 ft. lbs. when impacted on the dry wall side. In fact, it could not actually be measured, since the metal studs collapsed without the composite cracking or breaking. Other materials tested for impact actually failed at 100 to 200 ft. lbs. of impact. p In addition to impact resistance, the composite of this invention also meets the requirement of the National Fire Protection Association Life Safety Code 101 as "limited combustible" (NFPA 295). This requires the product to meet strict flame spread (ASTM E84) and BTU per lb. not exceeding 3500 BTU per lb. of sample per NFPA 259. An actual test sample of a composite of this invention consisting of an 0.81" thick polycarbonate sheet, contact adhesive and gypsum wallboard ¾" thick USG Ultracode wallboard, when subjected to NFPA 259 and NFPA 101 Limited Combustibles, had a total BTU content of 1746 BTU's per lb. of content. The maximum allowed per the above fire codes is 3500 BTU per lb. of content. In another system consisting of a laminate of ¾" thick USG Ultracode wallboard, contact adhesive and an 0.30" thick polycarbonate sheet when subjected to the same fire codes NFPA 259 and NFPA 101 Limited Combustibles, the total BTU per lb. of content was 956 BTU's per pound of content. The maximum allowed per the fire codes is 3500 BTU per lb. of content. It is further interesting to note that the BTU content of the 0.81" thick polycarbonate sheet above had a 8400 BTU content per lb. of polycarbonate sheet or 4872 BTU content per sq. ft. of polycarbonate sheet (0.58 lb. per sq. ft.).

In addition, the composite of this invention also meets the one hour fire endurance test when used with ⅝" thick type C gypsum wall board. This fire endurance test is conducted by Underwriters Laboratories, Inc. (ASTM E119-88) and has been found to be eligible for use in Design No. U495, as described in Underwriters Laboratories, Inc. Fire Resistance Directory, non-bearing wall rating—1 hr.

While this invention has been described in terms of the composite being a laminate of a dry wall product and a polycarbonate sheet, other thermoplastic sheet can also be employed herein in place of the polycarbonate sheet. For example, such sheeting material that can be employed herein, is polyvinyl chloride, polypropylene, polyethylene, polyetherimide ester, polyether ester, polycarbonate-acrylonitrile-styrene, etc., blends of the above polymers, and glass filled and flame retardant compositions of the above polymers and polymer compositions. In addition to the above thermoplastics that can be employed herein, thermoset and glass filled thermoset polymer sheets can also be employed herein. Also, a combination of two or more different thermoplastic sheets may be employed in the composite of this invention. In the event other plastic sheets or combinations of plastic sheets are used as disclosed herein, their use in the composite of this invention should be tested for both impact resistance, if such is a necessary requirement as for security wall systems, and for meeting required fire codes. Therefore, the thickness of the dry wall product and the thickness of the plastic sheet of the composite depends on complying with building and fire requirement codes. Further, while the wall system of this invention is described as being fastened to metal studs, the composite can also be fastened to other studs as well, providing the composite and the studs to which it is fastened meet the necessary codes (fire, building, etc.).

The following example is provided to illustrate the impact property of the unique composite of this invention and the critical feature with respect to impact by having the thermoplastic sheet on the inside of the security wall system i.e. the thermoplastic sheet side being in direct contact with the wall studs.

EXAMPLE 1

Test samples were prepared using a 0.090" thick polycarbonate sheet (LEXAN® LT300 sheet by General Electric Company) and ⅝" thick gypsum wall board type C with paper laminated to both sides. The polycarbonate sheet and the gypsum wall board were laminated together with 3M adhesive 3M1357. The test samples were about 4" square and were subjected to impact testing using a Dynatup impact tester by General Research Instruments.

Samples were tested with the polycarbonate sheet on the bottom side i.e. away from the side impacted and with the polycarbonate sheet on the top side i.e. on the side impacted.

Briefly, the test procedure involves subjecting samples to a falling dart impact. The dart is about a 0.5" diameter rod about 1.75" long and has a rounded, blunt end, which is the end that impacts upon the sample. The sample is clamped in a holding device. The dart is on a vertical sled or shaft, with weights added for energy impact determination. The test is designed to force failure of the sample in order to determine the type of failure occurring and the impact necessary to cause failure. The average velocity of the falling dart was about 11.2 feet per second and had a crosshead weight of 48.9 lbs. not including the weight of the dark, with a drop height of two feet.

In the Dynatup impact test, the energy absorbed by the sample by the falling dart is plotted on a graph from the time the dart first hits the sample until it punctures through the sample. E(max) is the maximum energy in ft.-lbs. absorbed by the sample at the peak of the graph, which is a chart of the energy absorbed by the sample. E(max) for each sample (except the gypsum wall board) was the average of three samples for each impact tested with the gypsum wall board. With the gypsum wall board, only one sample was tested because the impact resistance was so low.

The results obtained were as follows:

| | Polycarbonate bottom side | Polycarbonate top side | Polycarbonate sheet only 0.090" thick | Gypsum wall board ⅝" thick |
|---|---|---|---|---|
| Maximum impact energy to penetrate ft.-lbs.) | 58.4 | 45.2 | 37.5 | 1.6 |

As can be seen from the above Example, the impact resistance is increased almost 30% by having the polycarbonate sheet on the bottom side. In the security wall system of this invention, the polycarbonate sheet is the inner layer, namely the layer or sheet in contact with the wall studs.

DETAILED DESCRIPTION OF THE DRAWING

FIG. 1 is a cross section of the composite of this invention fastened to a building structure. The composite comprises dry wall 10, adhesive layer 12 and polycarbonate sheet 14. The composite is attached to metal studs 16 with self-tapping screws 18.

While this FIG. 1 shows a double security wall system, i.e. a composite security wall attached to each side of metal studs 16, a single composite security wall can be employed depending on the installation wanted. However, for the testing of the composites of this invention under the applicable fire codes as disclosed previously herein, a double composite wall system was employed, as shown in the drawing wherein one composite of this invention is fastened to each side of the metal wall studs 16.

It will thus be seen that the objects of this invention, as set forth above, among those made apparent from the preceding description are efficiently attained, and since certain changes may be made in carrying out the above invention, it is to be understood that the invention is not limited to the precise form. Changes and modifications may be made thereon without departing from the scope and spirit of the invention as defined in the appended claims.

What is claimed is:

1. A composite security laminate comprising in combination an outer dry wall type product, an inner aromatic polycarbonate sheet and an adhesive interlayer therebetween.

2. The aromatic polycarbonate sheet of claim 1 having a thickness of less than about ⅛".

3. The composite security laminate of claim 1 wherein the dry wall product is gypsum board having a paper sheet over at least the outside surface thereof.

4. The composite security laminate of claim 1 wherein the dry wall product is a composite of a densified paper film outer layer, a densified inner layer and a less densified interlayer core therebetween.

5. A composite security wall system comprising at least one composite security laminate fastened to at least one side of metal wall studs wherein the laminate comprises an outer dry wall product, an adhesive interlayer and an inner aromatic polycarbonate sheet.

6. The composite security wall system of claim 5 having a composite security laminate fastened both sides of metal wall studs.

* * * * *